INVENTORS
FRANKLIN W. DUNNING
BY DARWIN E. DEAN

Williams, David, Hoffman & Yount
ATTORNEYS

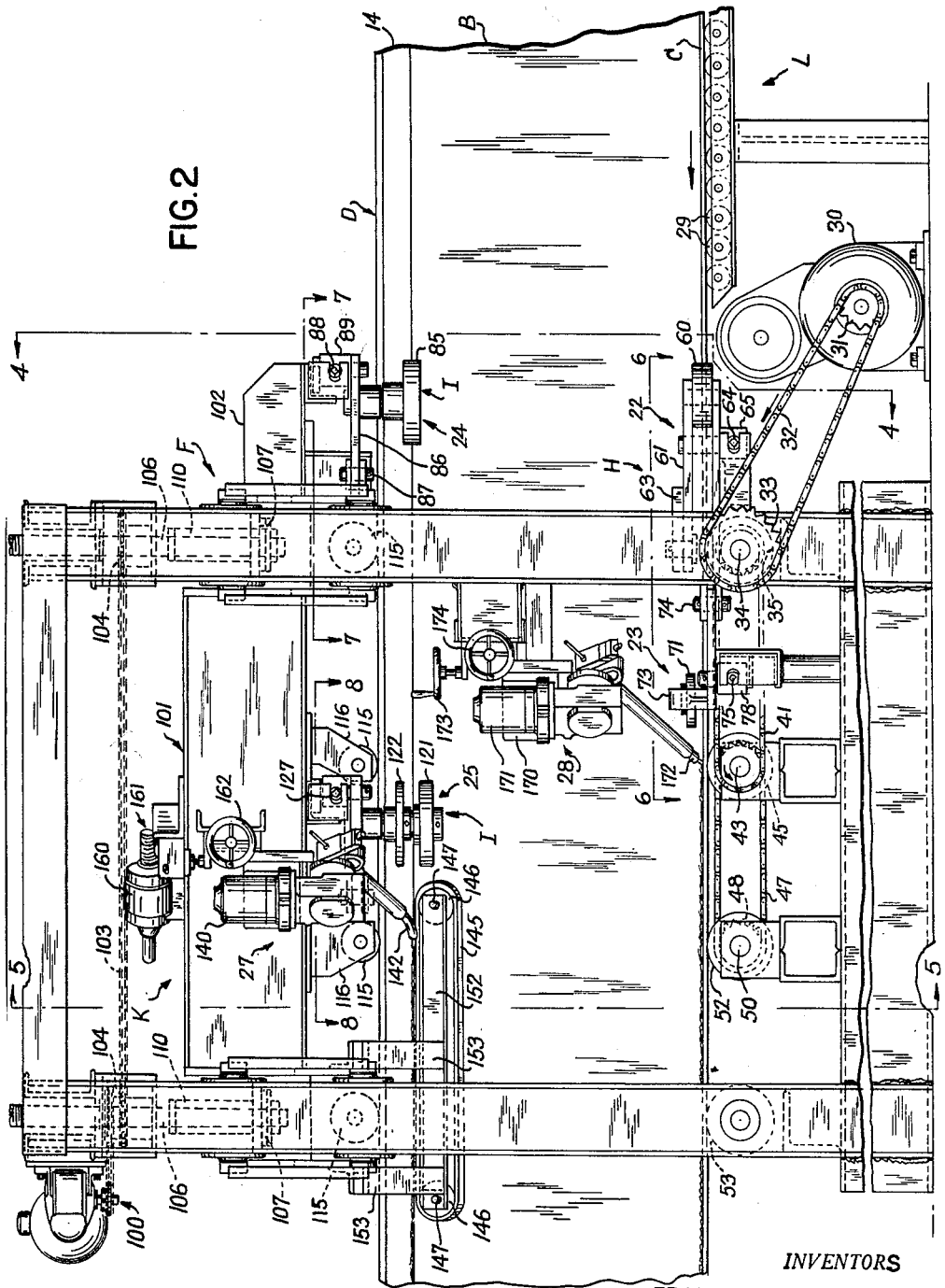

Oct. 27, 1964  F. W. DUNNING ETAL  3,154,665
WELDING MACHINE AND METHOD
Filed June 30, 1961  6 Sheets-Sheet 3

INVENTORS
FRANKLIN W. DUNNING
BY DARWIN E. DEAN

Williams, David, Hoffmann & Yount
ATTORNEYS

INVENTORS
FRANKLIN W. DUNNING
BY DARWIN E. DEAN
ATTORNEYS

Oct. 27, 1964   F. W. DUNNING ETAL   3,154,665
WELDING MACHINE AND METHOD
Filed June 30, 1961   6 Sheets-Sheet 5

INVENTORS
FRANKLIN W. DUNNING
BY DARWIN E. DEAN
Williams, David, Hoffmann & Yount
ATTORNEYS

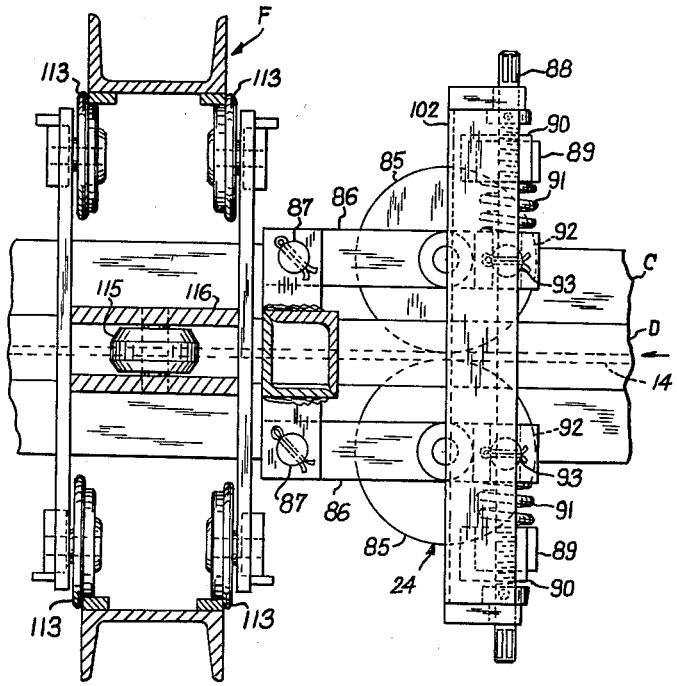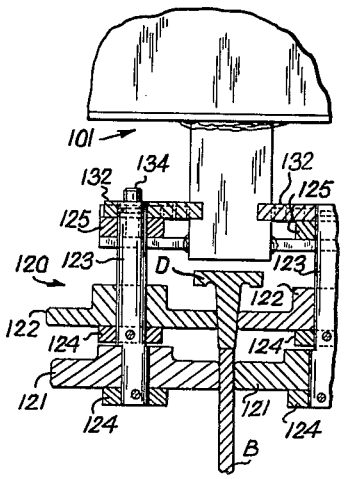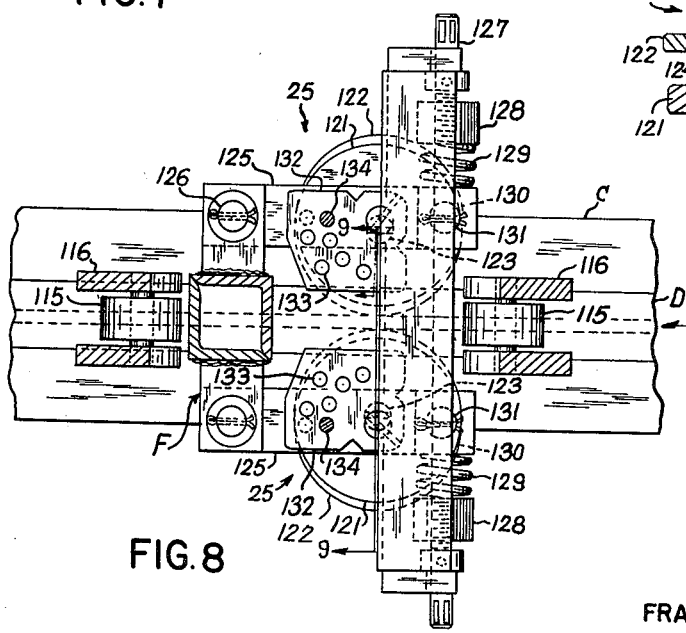

United States Patent Office 3,154,665
Patented Oct. 27, 1964

3,154,665
WELDING MACHINE AND METHOD
Franklin W. Dunning and Darwin E. Dean, Painesville, Ohio, assignors to The Cleveland Crane & Engineering Company, Wickliffe, Ohio, a corporation of Ohio
Filed June 30, 1961, Ser. No. 120,988
9 Claims. (Cl. 219—124)

The present invention relates to the manufacture or fabrication of beams by the welding together of a number of elongated metal pieces or parts, and more particularly, to a method and machine for welding together a number of elongated members to form a beam having an elongated web provided with oppositely projecting flanges adjacent to its long edges.

The principal object of the present invention is the provision of a novel and improved method and machine for welding a plurality of elongated members into a beam comprising a web and oppositely projecting flanges along or adjacent to both of the long edges of the web, which method and machine provide for holding the members in predetermined relationship to one another and for continuously feeding them past a plurality of welding heads which weld the member together as they pass thereby.

The invention resides in certain constructions and combinations of parts and further advantages of the invention will be apparent to those skilled in the art to which it relates from the following description of the preferred embodiment described with reference to the accompanying drawings forming a part of the specification, in which similar reference characters designate corresponding parts, and in which:

FIG. 2 is a side elevational view of the apparatus shown in FIG. 1;

FIG. 7 is a view approximately on the section line 7—7 of FIG. 2;

FIG. 8 is a view approximately on the section line 8—8 of FIG. 2;

FIG. 9 is a view approximately on the section line 9—9 of FIG. 8; and

Figure 1:
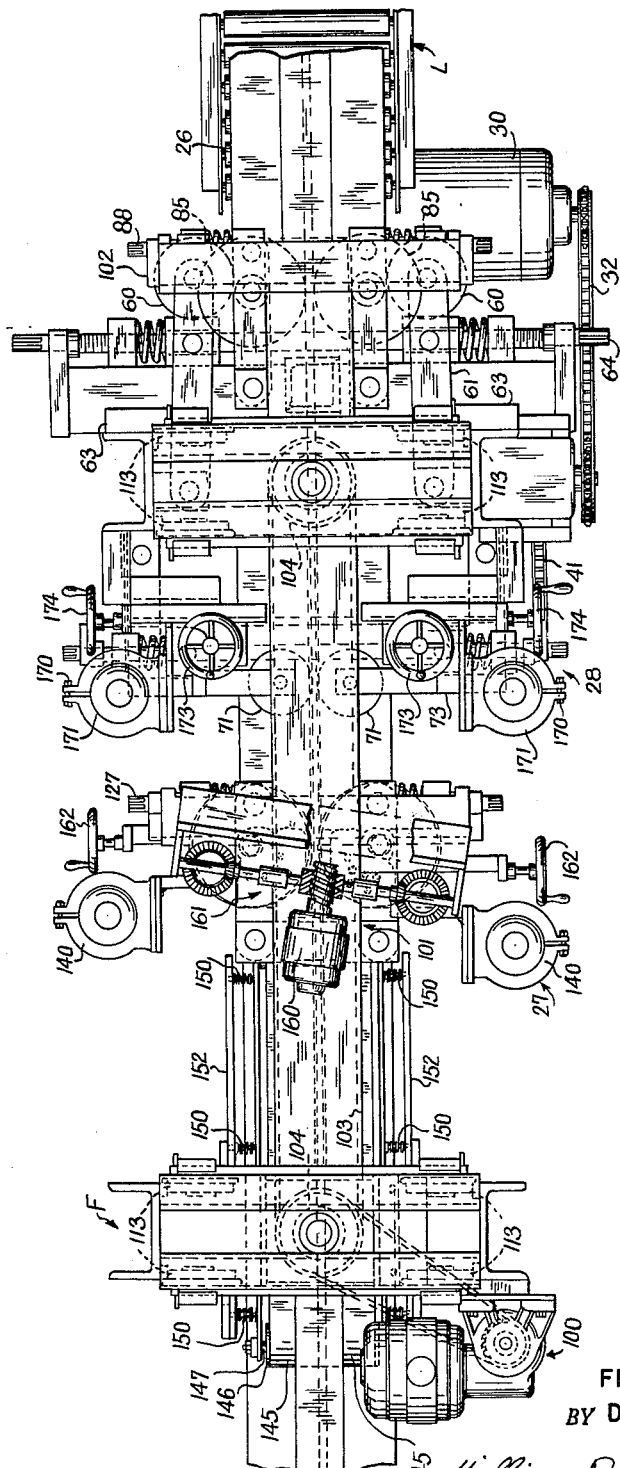
FIG. 1 is a plan view with certain parts removed of a machine or apparatus embodying the present invention.
Figures 3, 4:
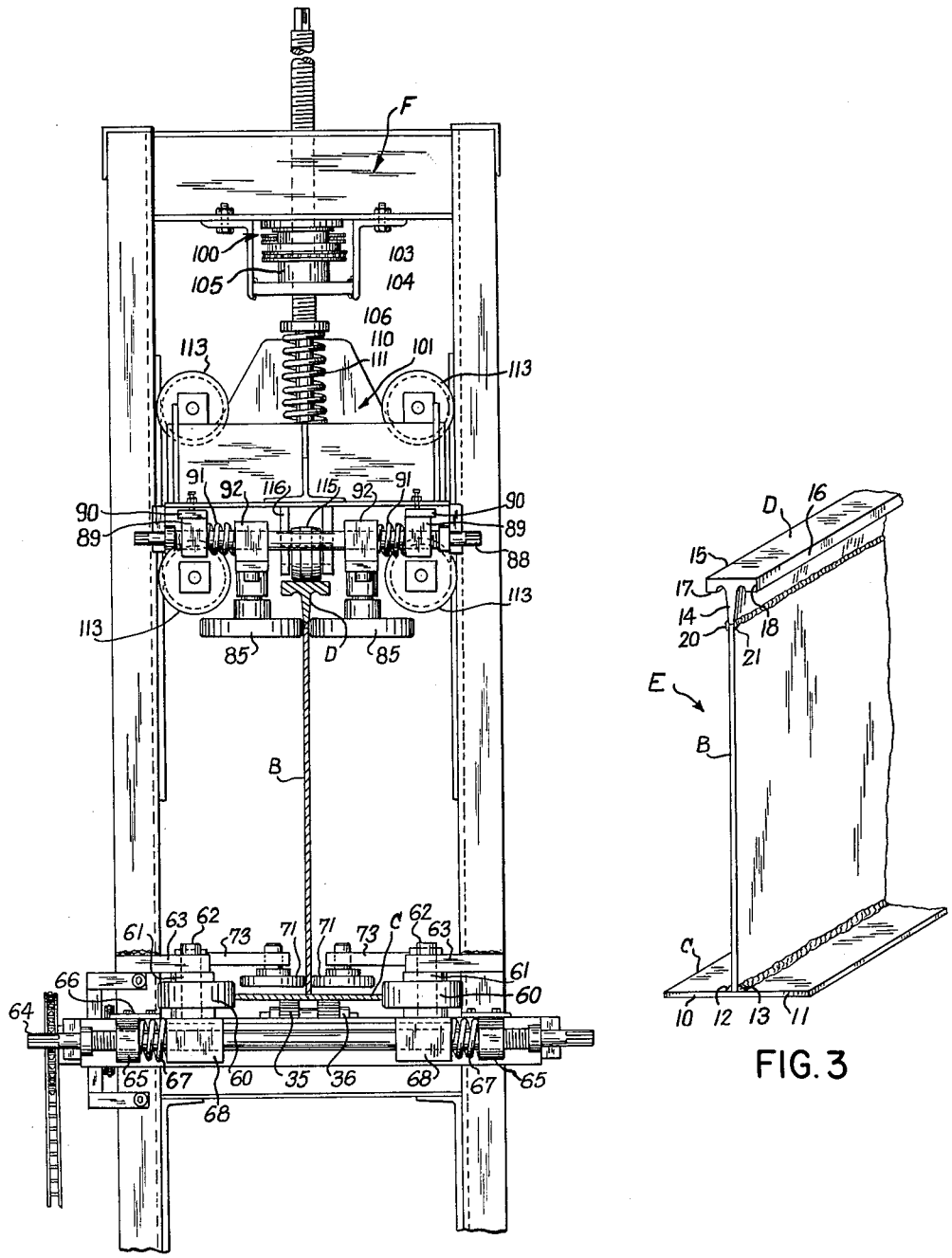
FIG. 3 is a perspective view of a portion of the beam shown in FIGS. 1 and 2 as it emerges from the apparatus with the parts thereof welded together.
FIG. 4 is a view approximately on the section line 4—4 of FIG. 2.
Figure 5:
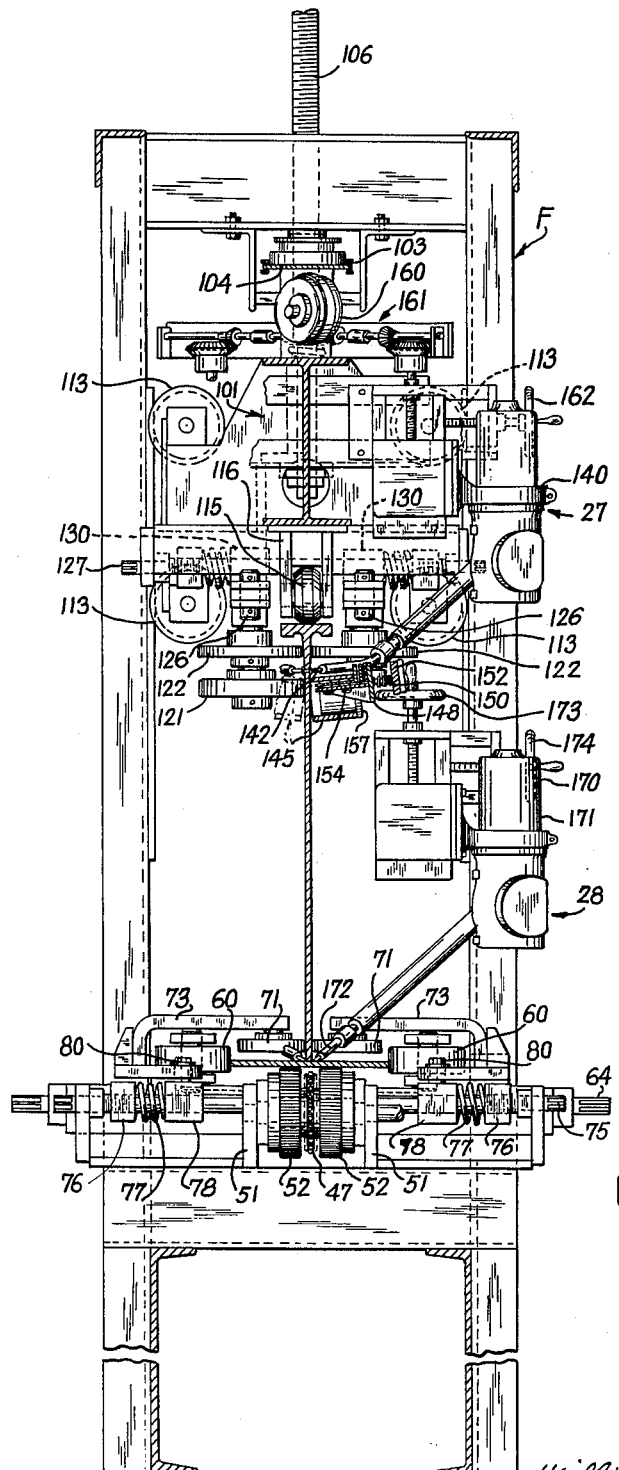
FIG. 5 is a view approximately on the section line 5—5 of FIG. 2 with certain parts removed and others broken away.
Figure 6:
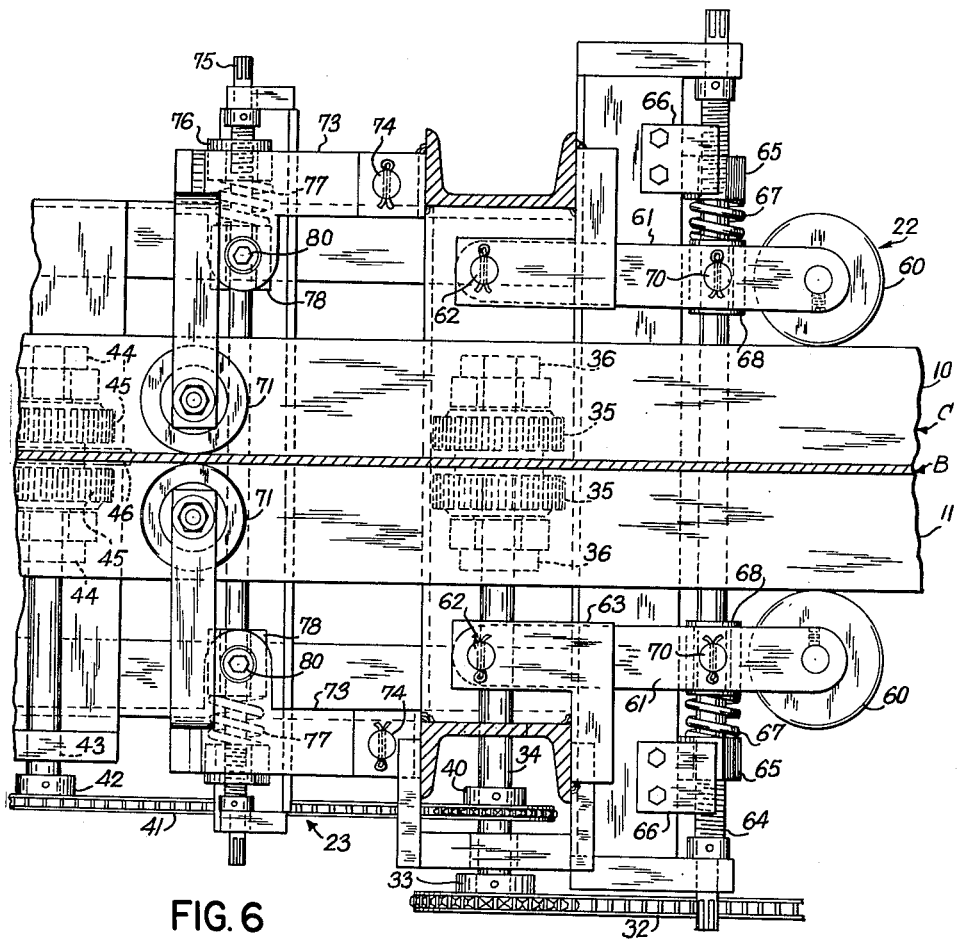
FIG. 6 is a view approximately on the section line 6—6 of FIG. 2.

While the invention is susceptible of being variously practiced and embodied in various machines, it is herein shown and described as applied to the welding of three elongated members into a beam particularly adapted for use as a rail for an overhead monorail trolley or carrier type material handling system. It is to be understood, however, that there is no intention to limit the invention to the specific uses, procedures, and construction referred to and it is our intention to hereby cover all adaptations, modifications and alternative constructions coming within the spirit and scope of the invention as expressed in the appended claims.

The present invention is shown in the drawings as applied to a machine adapted to weld three elongated members B, C and D together to form a beam E, which is generally designed to be used as the carrier supporting track of an overhead monorail carrier type material handling system, with the welding being performed with the beam inverted with respect to the position it occupies when in use. The member B is a flat web plate to one long edge of which a second member, plate C, is welded. The web plate B is positioned at right angles to the plate C and is welded to the plate C along the center line of plate C. The portions of the plate C at opposite sides of the plate B form flanges 10, 11 and thus this plate is herein referred to as the flange plate. The web plate B and the flange plate C are secured together by two welds 12 and 13, one along each of the two opposite sides of the web plate B, where it abuts the center line of flange plate C. The third member of the beam, T-beam D, has a web portion 14 and oppositely projecting flange portions 15, 16 extending in substantially a perpendicular direction adjacent one long edge of web portion 14. The other long edge of the web 14 of the T-beam D is welded to the long edge of the web plate or member B, opposite the edge to which the flange plate or member C is welded. The projecting flanges 15 and 16 of the T-beam D are provided with raised treads 17, 18 to be engaged by carrier wheels, but this is immaterial to the present invention and may be omitted. The web and T-beam members B and D are secured together by two welds 20 and 21, one along each of the two opposite sides of the abutting edges of the web 14 of the T-beam D and the web plate B. The welds 12, 13 and 20, 21 between the members B, C and B, D, respectively, preferably extend the length of the beam and form one continuous bond or union between the respective members of the beam.

The beam E, as stated above, is designed particularly for use as the carrier supporting track of an overhead monorail carrier type material handling system. The particular size of beam used for such a purpose depends upon a number of factors including the length of the beam span and the maximum load the beam will be required to carry. These factors, of course, are important regardless of how or where the beam is used. The machine shown on the drawings is provided with suitable adjustable mechanism so that it may be used to form beams of different dimensions to meet different requirements.

Referring to the drawings, the machine shown comprises a frame F supporting in its lower portion a lower aligning mechanism H. The aligning mechanism H includes roller means 22 and 23 which are spaced along the path of movement of the beam members, for aligning web plate B and flange plate C prior to and during their being welded together. The roller means 22 and 23 are adjustable, as described in detail hereinbelow, so that they may operate properly on flange plates C of different widths and web plates B of different thicknesses. An upper aligning mechanism I is mounted in the upper portion of the frame F of the machine on a vertically movable crosshead assembly K. The aligning mechanism I includes roller means 24 and 25, which are spaced along the path of movement of the beam members, for aligning T-beam D and flange plate B. The roller means 24 and 25 are adjustable, as described in detail hereinbelow, so that they may function to align flange plates of different thicknesses with T-beams which have web portions 14 that may be of different thicknesses. The upper aligning mechanism I, being mounted on the crosshead assembly K, can be moved in a vertical direction so that roller-aligning means 24 and 25 can be properly positioned to align the T-beam and flange plate B regardless of the size of the vertical dimension of the members B, C, and D in their assembled positions.

Welding apparatus 27 for forming welds 20 and 21 is also mounted on the crosshead assembly K, and in such a manner as to be adjustable vertically with respect to the crosshead assembly and transversely of the direction of feed of the beam. This permits the welding mechanism 27 to be positioned properly to form welds 20 and 21, regardless of the dimension of the members B, C and D. A welding mechanism 28 for forming welds 12 and 13 is mounted in the lower portion of the frame F in such a manner as to be adjustable vertically and transversely of the direction of feed of the beam, so that welds 12 and 13 can be properly formed regardless of the dimensions of the beam members, as the beam members are fed into the machine.

The beam members are fed into the machine from a suitable supporting mechanism L which includes roller conveyor 29. The supporting mechanism L supports the three members B, C and D, prior to their being welded, in the approximate position which they occupy during the welding operation. The parts B, C and D may be tack welded at spaced intervals sufficiently to hold them together during the handling prior to the welding operation.

Some suitable mechanism is utilized for continuously feeding the members B, C and D from the support L through the machine while the members are in the approximate position which they occupy during the welding operation. As shown in the drawings, this feeding mechanism comprises a motor 30 which continuously drives a sprocket wheel 31. A chain 32 is trained around the sprocket wheel 31 and a similar sprocket wheel 33, which is mounted on a shaft 34 rotatably mounted on the frame F. A pair of hardened knurled rollers 35 are mounted on the shaft 34 between plates 36 which rotatably support the shaft 34. A sprocket wheel 40, like sprocket wheel 33, is also mounted on the shaft 34 and a sprocket chain 41 is trained around the sprocket wheel 40 and around a similar sprocket wheel 42 on a shaft 43. The shaft 43 is parallel to shaft 34, spaced from the shaft 34, and substantially in the same plane as the shaft 34. Mounted on the shaft 43 between plates 44 which rotatably support shaft 43, are a pair of hardened knurled rollers 45. A sprocket wheel 46 is mounted on the shaft 43 between the spaced rollers 45, and a chain 47 is trained around the sprocket wheel 46 and around a sprocket wheel 48 mounted on a shaft 50, which is rotatably supported by a pair of plates 51. The shaft 50 is spaced from the shaft 43, and is parallel to the shaft 43. Mounted on the shaft 50 on opposite sides of sprocket wheel 48 are hardened knurled rollers 52. The hardened knurled rollers 35, 45 and 52 engage the underside of the flange member C of the beam to apply a driving force to the member C of the beam and continuously advance the members B, C and D through the machine. Suitable idler rollers such as 53, shown in FIG. 2, are preferably used in combination with the hard knurled rollers to support and guide the beam members while being advanced through the machine.

As the members B, C and D are advanced from the support L toward the drive rollers 35, and prior to the engagement of the bottom surface of the member C with the drive rollers 35, the side edges of flanges 10, 11 of the member C are engaged by rollers 60 of roller means 22 aligned or which assist in aligning and maintaining the members B, C and D in a predetermined position. The rollers 60 are rotatably supported on roller arm means 61 mounted on pins 62, which pins are rotatably secured to brackets 63 welded to a portion of the frame F of the machine. The spacing between the rolls 60 can be adjusted by means of a shaft 64 restrained against axial movement and rotatably mounted in the frame F with the ends thereof designed to be turned by a suitable tool. The opposite end portions of the shaft 64 are oppositely threaded, and a pair of internally threaded nuts 65 are positioned on the ends of the shaft 64 to cooperate with the threads on the shaft. Plates 66 suitably secured to the frame F of the machine engage a portion of nuts 65 in a manner which permits the nuts 65 to slide with respect to the plates but which prevents the nuts 65 from rotating with shaft 64. The nuts 65 abut the outer ends of springs 67 which encircle and are slidable on the shaft 64. The inner ends of the springs 67 engage against slide blocks 68 also mounted on shaft 64. The roller arm means 61 are connected intermediate their pivot connections with the members 63 and the rollers 60 carried in the ends thereof by pins 70 secured to the slide blocks 68 and extending from the slide blocks 68 through suitable apertures in roller arm means 61. It is apparent that the slide blocks 68 are moved by rotating shaft 64 which causes pins 70 to pivot roller arms 61 about the center of pins 62. The springs 67 are extremely stiff and function to prevent damage to the machine in the event the width of flange member C varies or if the beam would warp during welding.

As the members B, C and D are advanced through the machine and after the leading end of the members B, C and D has passed aligning rollers 60, the opposite sides of the member B are engaged by a pair of aligning wheels 71 of roller means 23. The aligning wheels 71 are adjustably mounted so that the spacing between the aligning wheels 71 can be changed, depending upon the thickness of the member B. The aligning wheels 71 are rotatably supported in arm members 73. The members 73 are pivotally supported by means of pins 74 in the frame of the apparatus, and the members 73 can be pivoted about pin 74 by rotating a shaft 75, the ends of which are oppositely threaded. Rotation of shaft 75 will move internally threaded nuts 76 toward or away from each other depending upon the direction of rotation of shaft 75. The threaded nuts 76 preferably bear against springs 77, which encircle shaft 75 and in turn bear against slide blocks 78 slidably supported on shaft 75. Pins 80 are suitably secured to the slide blocks 78 and also to the L-shaped members 73. Thus, when the shaft 75 is rotated the threaded nuts 76 will move toward or away from each other, depending upon the direction of rotation of the rod 75, and the springs 77 will cause the slide blocks to move toward or away from each other. This will cause pins 80 to pivot the arm members 73 about the axis of pins 74. Springs 77 are similar in operation to springs 67 and, like springs 67, are stiff and prevent damage to the machine due to changes in the width of member B of the beam being formed. It is to be understood, however, that springs 77 and 67 may be entirely eliminated, if desired.

As the members B, C and D begin their advance through the machine almost simultaneously with the engagement of the roller 60 with the side edges of the flange portions 10, 11 of flange member C, rollers 85 will engage the opposite sides of the member B and the portion 14 of the member D in the area where the member 14 abuts the member B. In fact, the rollers 85, which are a part of roller means 24, will engage these members precisely where they are to be welded in order to assist in aligning the members in a predetermined position for proper welding. Like the aligning rollers 60 and 71 which engage members C and B to align the beam with respect to a predetermined position, the aligning rollers 85 are also adjustable. As shown in FIG. 7, the aligning rollers 85 are rotatably supported by arms 86 which are pivotally mounted in the frame of the machine by pins 87. The arms 86, and therefore the rollers 85, are moved toward and away from each other by rotation of shaft 88, the ends of which are oppositely threaded. Cooperating with the shaft 88 are internally threaded nuts 89 which can be moved along the shaft 88 by rotating the shaft. Plates 90 engage a portion of nuts 89 in a manner which permits the nuts 89 to slide with respect to plates 90 but which prevents rotation of nuts 89 with shaft 88. The nuts 89 bear against springs 91, similar in operation and function to that of springs 77 and 67, which in turn bear against slide blocks 92. Suitably secured to the slide blocks 92 are pins 93 which extend from the slide blocks 92 to arms 86. Thus it can be seen that upon rotation of the shaft 88 the threaded nuts 89 will be moved toward or away from each other, thus causing the slide blocks 92 to be moved toward or away from each other and thereby causing the rollers 85 to move toward and away from each other by pivoting about the axes of pins 87.

The rollers 85 not only can be adjusted toward and away from each other to compensate for different thicknesses of the member B and portion 14 of the member D of the beam, but the rollers 85 also can be raised and lowered to compensate for changes in the height of the various members which comprise the beam. This raising and lowering is accomplished by motor drive means 100, which raises and lowers the crosshead assembly K including a crosshead 101, an extension 102 of which supports the rollers 85.

The drive means 100 which raises and lowers the crosshead 101 drives a chain 103 which is trained over a pair of spaced sprockets 104. The sprockets 104 are secured to internally threaded collars 105 which are mounted on the frame F and encircle a pair of spaced threaded rods 106 which are rotatably mounted in the frame of the machine and secured at one end to the frame of the crosshead 101 by suitable means 107 best seen in FIG. 2. The threads of the collars 105 engage the threads on the rods 106 and cause the rods 106 to raise or lower depending upon the direction of rotation of the threaded collars 105. Also mounted on the threaded rods 106 are thrust washers 110. Interposed between the thrust washers 110 and the frame portion of the crosshead 101 are springs 111. Thus it is apparent that upon rotation of the chain 103 and threaded collar 105 the rods 106 will be raised or lowered, causing the securing means 107 to raise or lower and the crosshead 101 to move in a vertical direction. The crosshead 101 is guided in its vertical movement by a plurality of rollers 113, positioned in a manner to engage certain vertical members of the frame F of the machine.

Additional mechanism to assist in miantaining the members B, C and D in position while they are being fed through the machine is mounted on the crosshead 101. This mechanism includes a plurality of hold down rollers 115 secured to the crosshead 101 by means of brackets 116. These rollers 115 engage the top side of the flange portions of the member D to hold and guide the members B, C and D. Upon lowering of the crosshead 101 the rollers 115 will engage the top side of the flange portion of the member D and further attempted lowering of the crosshead will compress springs 111 to maintain a vertical pressure on the members of the beam.

Other aligning roller mechanisms 120, which comprise roller means 25, are also mounted on the crosshead 101 for vertical movement with the crosshead. The aligning roll mechanisms 120 include a pair of rollers 121 and 122, which engage opposite sides of member B and portion 14 of the member D of the beam, respectively, adjacent the abutting edges of members B and D. The rollers 121 and 122 of the roll mechanisms 120 are rotatably mounted on one end of eccentric shafts 123, and are rotatably held thereon by collars 124 fixedly secured to shafts 123 in such a position that the rollers 121 and 122 have spaced centers of rotation as best shown in FIG. 9. The eccentric shafts 123 extend through apertures in arms 125, which are pivotally mounted by pins 126 to the frame F of the machine. A mechanism for pivoting the arms 125 about the axis of pins 126 is similar to the mechanism for adjusting the rollers 85 previously described. As shown in FIG. 8, this mechanism includes a shaft 127 axially retained and rotatably mounted in the frame of the machine and threaded at its ends in opposite directions and which threads cooperate with threaded nuts 128 bearing against springs 129, which in turn bear against slide blocks 130 which are slidably mounted on the shaft 127. Pins 131 extend from the slide blocks 130 to the arms 125 and are secured to the slide blocks 130 and the arms 125. Thus rotation of the shaft 127 in either direction will cause the arms 125 to move toward and away from each other, as discussed above with respect to the rollers 85.

The roller mechanisms 120 are so constructed that the spacing between rollers 121 may be varied without changing the spacing between the rollers 122. This construction includes plates 132 secured to one end of eccentric shafts 123, which are opposite the end of shafts 123 on which rollers 121, 122 are mounted. The plates 132 extend parallel to arms 125 and are provided with a plurality of apertures 133, which cooperate with pins 134 in a manner explained hereinbelow. By rotating either of the plates 132 the corresponding shaft 123 will be rotated and by positioning an aperture 133 of the plate 132 in alignment with a similar aperture in the arm 125 and inserting the pin 134 through the apertures, as shown in FIG. 9, the arm 125 and the rotated shaft 123 can be secured in the position to which they have been rotated. Rotation of the shaft 123 by means of the plate 132 causes roller 122 to rotate about its center of rotation and roller 121 to pivot about the center of rotation of roller 122. Thus the distance between the rollers 121 changes without changing the distance between the rollers 122 of the roller aligning mechanisms 120. Therefore, for any given thickness of web plate B or T member D a variety of thicknesses of T members D or web plates B, respectively, can be used to form a final rail beam.

Figure 10:
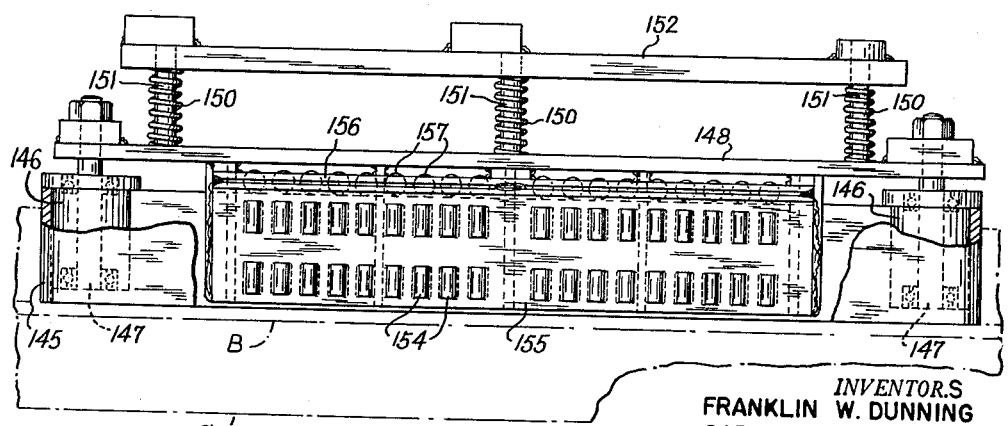
FIG. 10 is a plan view with portions broken away of one of the flux conveyors forming a part of the apparatus of FIG. 1.

The welding apparatus 27 to make welds 20, 21 which secure the members B, D together is also mounted on the crosshead 101. This welding apparatus includes two welding mechanisms 140 which are located in such a manner as to position welding rods on opposite sides of the abutting edges of web 14 of member D and member B of beam E. The welding mechanisms 140 include commercially available welding heads 143 which feed and activate the welding rods 142. The welding rods 142 are fed into position above small conveyor belts 145 which extend along the abutting edges of the members B and D and slightly below the abutting edges. The conveyor belts 145, best shown in FIG. 10, are tilted somewhat and the upper run of the conveyor belts 145 engage the sides of the member B. The conveyor belts 145 are free running, preferably, and are trained over drums 146 which are freely rotatable on shafts 147. The shafts 147 are secured to a plate 148 which extends lengthwise of the conveyor belt and which is yieldably mounted by means of springs 150 which encircle rods 151, which in turn are secured to member 152, which is suitably secured to the frame F by support members 153. The upper run of belts 145 are supported by a plurality of rollers 154 supported by plate members 155. A plate member 156 extends vertically from plate member 155 and supports a plurality of rollers 157 which engage the side of belts 145 opposite the side that engages the web member B. As a result of the engagement of conveyor belts 145 with the member B, the conveyor belts 146 are moved around shafts 147 as the member B is moved for a purpose to be explained hereinbelow. The welding heads 140 can be raised or lowered with respect to the conveyor belts 145 by a drive means, 160 which drives suitable gearing 161, which is operatively connected to the repsective welding units 140. The welding heads 140 also can be moved transversely of the direction in which the members B, C and D are moved by rotation of hand wheels 162.

The welding is preferably of the submerged arc type in which the arc between the electrodes 142 is totally submerged by flux. Therefore, it is necessary to feed granular flux into position on the conveyor belts 145 in advance of the electrodes 142. This flux is supported and moved along by the conveyor belt 145 past the electrodes 142 to envelop the electrodes 142. The arc between the electrodes 142 is thus completely submerged beneath the flux, and a pool of molten metal is also submerged beneath the flux. The flux, after it has moved past the electrodes 142 is removed from the end of the conveyor belts 145 by some suitable means, such as a suction tube, not shown, and is returned to a supply which holds the flux until it is reused in the welding operation.

The welding apparatus 28 to make welds 12, 13 which secure member B to member C includes welding mechanisms 170 which are similar to the welding mechanisms 140, and are positioned on the frame of the machine disclosed in such a manner as to weld the edge of the member B to the center line of the member C. Preferably, this welding operation is performed prior to the welding of the member B to the member D, however, it could be performed after. The welding mechanisms 170 comprise commercially available welding heads 171 which feed and activate electrodes 172. The welding mechanisms 170 can be raised and lowered manually by rotating hand wheels 173 and can be moved transversely of the direction of feed of the members B, C, D by rotating hand wheels 174. Thus the electrodes 172 can be properly positioned to perform their welding operation.

The welding performed by welding mechanisms 170 is preferably of the same nature as the welding performed by the welding mechanisms 140, namely, the submerged arc type. However, the welding mechanisms need not necessarily perform the same type of welding. To make welds 12, 13 the flux is directed by some suitable means onto the member C before the area to be welded passes the electrodes 172. The flux is moved along with the member C and envelops the end of the electrodes 172. Thus the arc between the electrodes 172 as well as a pool of molten metal is submerged under the flux. The flux is moved beyond the electrodes by the continuous movement of member C and is removed from the member C by some suitable means such as a suction tube which directs the flux back to a supply means for reuse.

It can be seen that the applicants have devised a new and improved method and machine for welding a plurality of elongated members into a beam and although the invention has been described in considerable detail, it will be apparent that the invention is not limited to the construction shown nor the uses referred to and it is my intention to cover hereby all adaptations, modifications, and changes which come within the practice of those skilled in the art to which the invention relates and the scope of the appended claims.

Having described our invention, we claim:

1. A method of forming an overhead monorail combination beam and rail including a T-shaped rail member having its stem welded to one edge of a plate member having its other edge welded to one side of another plate member substantially normal thereto comprising the steps of:

supporting a first plate member in a generally vertical position with its lower edge abutting one side of a generally horizontal second plate member inwardly of its edges and the lower edge of the stem of a T-shaped rail member on the upper edge of said first plate member;

continuously moving said members past first and second pairs of metallic arc welding electrodes, said electrodes of each pair being adjacent to one another but located at opposite sides of said members;

aligning said members while being continuously moved past said electrodes to position the abutting edge portions of said stem of said T-shaped member and said first plate member in predetermined position with respect to one of said pairs of said electrodes and the other edge of said plate member and the portion of said second plate member against which it abuts and to which it is to be welded in predetermined position with respect to the other of said pairs of said electrodes;

supplying a granular flux material on opposite sides of said abutting portions of said members to envelop said abutting portions of said members and the ends of said electrodes adjacent thereto; and activating said electrodes to form electric arcs submerged in said flux material at opposite sides of said abutting portions of said members to produce pools of molten weld metal between the ends of said electrodes as said members move thereby whereby said abutting portions of said members are progressively welded together.

2. An apparatus for forming an overhead monorail combination beam and rail including a T-shaped rail member having its stem welded to one edge of a plate-like web member and which web member has its opposite edge welded to a side of a plate-like flange member comprising:

means supporting a plate-like web member in a generally vertical position with its lower edge abutting a side of a generally horizontally supported plate-like flange member inwardly of its edges and a T-shaped rail member above said web member with the lower edge of its stem adjacent to the upper edge of said web member;

two pairs of metallic arc welding electrodes;

means supporting said electrodes of each pair adjacent to one another but at opposite sides of said members;

means continuously moving said members past said electrodes;

means aligning the abutting portions of said stem of said rail member and said web member in predetermined position with respect to one of said pairs of said electrodes and the abutting portions of said web and flange members in predetermined position with respect to the other of said pairs of said electrodes;

means supplying and supporting granular flux material at opposite sides of said abutting portions of said members to envelope said abutting portions and the ends of said electrodes adjacent thereto; and means activating said electrodes to form electric arcs submerged in said flux material at opposite sides of said abutting portions of said members to produce pools of molten weld metal between the ends of said electrodes as said members move thereby whereby said abutting portions of said members are progressively welded together.

3. An apparatus for forming an overhead monorail combination beam and rail including a T-shaped rail member having its stem welded to one edge of a plate-like web member and which web member has its opposite edge welded to a side of a plate-like flange member comprising:

means supporting a plate-like web member in a generally vertical position with its lowe redge abutting a side of a plate-like flange member inwardly of its edges and a T-shaped rail member above said web member with the lower edge of its stem adjacent to the upper edge of said web member;

means supporting said plate-like flange member in a generally horizontal position;

two pairs of metallic arc welding electrodes;

means supporting said electrodes of each pair adjacent to one another but at opposite sides of said members;

means continuously moving said members past said electrodes;

means aligning the abutting portions of said stem of said rail member and said web member in predetermined position with respect to one of said pairs of said electrodes and the abutting portions of said web and flange members in predetermined position with respect to the other of said pairs of said electrodes;

means supplying and supporting granular flux material at opposite sides of said abutting portions of said members to envelop said abutting portions and the ends of said electrodes ajacent thereto;

said means for supporting said flux material at opposite sides of said abutting portions of said rail and web members comprising belt-like members at opposite sides of said members having upper generally horizontal reaches the edges of which adjacent to said members contact opposite sides of said web member a short distance below its upper edge; and means activating said electrodes to form electric arcs submerged in said flux material at opposite sides of said abutting portions of said members to produce pools of molten weld metal between the ends of said electrodes as said members move thereby whereby said abutting portions of said members are welded together.

4. An apparatus for forming an overhead monorail combination beam and rail including a T-shaped rail member having its stem welded to one edge of a plate-like web member and which web member has its opposite edge welded to a side of a plate-like flange member comprising:

means supporting a plate-like web member in a generally vertical position with its lower edge abutting a side of a plate-like flange member inwardly of its edges and a T-shaped rail member above said web member with the lower edge of its stem adjacent to the upper edge of said web member;

means supporting said plate-like flange member in a generally horizontal position;

two pairs of metallic arc welding electrodes;

means supporting said electrodes of each pair adjacent to one another but at opposite sides of said rail and plate-like members;

means continuously moving said rail and plate-like members past said electrodes;

means for aligning the abutting portions of said stem of said rail member and said upper edge of said web member with respect to one another and with one of said pairs of said electrodes including a pair of shafts at opposite sides of said rail and web members supported for angular adjustment about their longitudinal centers and each having an eccentric;

pair of rollers supported on said shafts, one of said pairs of rollers being supported on said eccentrics;

means aligning the abutting portions of said plate-like members with the other pair of said electrodes;

means supplying and supporting granular flux material at opposite sides of said abutting portions of said rail and plate-like members to envelop said abutting portions thereof and the ends of said electrodes adjacent thereto; and means activating said electrodes to form electric arcs submerged in said flux material at opposite sides of said abutting portions of said rail and plate-like members to produce pools of molten weld metal between the ends of said pairs of said electrodes as said rail and plate-like members move thereby whereby said abutting portions of said rail and plate-like members are welded together.

5. An apparatus for forming an overhead monorail combination beam and rail including a T-shaped rail member having its stem welded to one edge of a plate-like web member and which web member has its opposite edge welded to a side of a plate-like flange member comprising:

means supporting a plate-like web member in a generally vertical position with its lower edge abutting a side of a plate-like flange member inwardly of its edges and a T-shaped rail member above said web member with the lower edge of its stem adjacent to the uper edge of said web member;

means supporting said plate-like flange member in a generally horizontal position;

two pairs of metallic arc welding electrodes;

means supporting said electrodes of each pair adjacent to one another but at opposite sides of said members;

means continuously moving said members past said electrodes;

means for aligning the abutting portions of said stem of said rail member and said upper edge of said web member with respect to one another and with one of said pairs of said electrodes including a pair of roller carrying members at opposite sides of said rail and plate-like members supported for movement towards and from the plane of said web member, a pair of vertically spaced rollers connected to each of said roller carrying members adapted to engage the stem of said rail member and said web member adjacent to but above and below said abutting portions thereof, and means for adjusting said rollers of each of said pairs relative to one another towards and from said stem of said rail member and said web members;

means aligning the abutting portions of said plate-like members with the other pair of said electrodes;

means supplying and supporting granular flux material at opposite sides of said abutting portions of said rail and plate-like members to envelop said abutting portions and the ends of said electrodes adjacent thereto; and means activating said electrodes to form electric arcs submerged in said flux material at opposite sides of said abutting portions of said rail and plate-like members to produce pools of molten weld metal between the ends of said pairs of said electrodes as said rail and plate-like members move thereby whereby said abutting portions of said rail and plate-like members are welded together.

6. An apparatus for forming an overhead monorail combination beam and rail including a T-shaped rail member having its stem welded to one edge of a plate-like web member and which web member has its opposite edge welded to a side of a plate-like flange member comprising:

means supporting a plate-like web member in a generally vertical position with its lower edge abutting a side of a plate-like flange member inwardly of its edges and a T-shaped rail member above said web member with the lower edge of its stem adjacent to the upper edge of said web member;

means supporting said plate-like flange member in a generally horizontal position;

two pairs of metallic arc welding electrodes;

means supporting said electrodes of each pair adjacent to one another but at opposite sides of said members;

means continuously moving said members past said electrodes;

means for aligning the abutting portions of said stem of said rail member and said upper edge of said web member with respect to one another and with one of said pairs of said electrodes including a pair of roller carrying members at opposite sides of said rail and plate-like members supported for pivotal movement about axes generally parallel to the plane of said web member, a pair of shafts supported in said roller carrying members with their longitudinal centers generally parallel to the plane of said web member and adjustable about their longitudinal centers and each having an eccentric portion, pairs of vertically spaced rollers connected to said shafts and adapted to engage the stem of said rail member and said web member adjacent to but above and below said abutting portions thereof, one of said pairs of rollers being supported on said eccentrics, and means for adjusting said shafts about their longitudinal centers;

means aligning the abutting portions of said plate-like members with the other pair of said electrodes;

means supplying and supporting granular flux material at opposite sides of said abutting portions of said members to envelop said abutting portions and the ends of said electrodes adjacent thereto; and means activating said electrodes to form electric arcs submerged in said flux material at opposite sides of said abutting portions of said members to produce pools of molten weld metal between the ends of said pairs of said electrodes as said rail and plate-like members move thereby whereby said abutting portions of said members are welded together.

7. An apparatus for forming an overhead monorail combination beam and rail including a T-shaped rail member having its stem welded to one edge of a plate-like web member and which web member has its opposite edge welded to a side of a plate-like flange member comprising:

a frame structure;

means for supporting a plate-like web member in a generally vertical position with its lower edge abutting a side of a plate-like flange member inwardly of its edges and a T-shaped rail member above said web member with the lower edge of its stem adjacent to the upper edge of said web member;

roller means carried by said frame supporting said plate-like flange member in a generally horizontal position;

two pairs of metallic arc welding electrodes;

a crosshead structure above said rail member and supported by said frame structure for adjustment in a generally vertical direction;

means supporting said electrodes of one of said pairs of said electrodes in said crosshead structure adjacent to one another but at opposite sides of said web member;

said means supporting said rail member and said web member being adapted to align the abutting portions of said stem of said rail member and said upper edge of said web member with respect to one another and with one of said pairs of electrodes and including a pair of shafts positioned at opposite sides of said rail and plate-like members supported in said crosshead structure for adjustment about their longitudinal centers and each having an eccentric portion, a pair of vertically spaced rollers connected to each of said shafts adapted to engage the stem of said rail member and said web member adjacent to but above and below said abutting portions thereof, and means for angularly adjusting said shafts to adjust said rollers of each of said pairs of rollers relative to one another towards and from said stem of said rail member and said web member;

means carried by said crosshead structure supporting granular flux material at opposite sides of said abutting portions of said rail and web members to envelop said abutting portions thereof and the ends of said electrodes of said one pair of said electrodes adjacent thereto;

means supporting the other of said pairs of said electrodes in said frame structure at opposite sides of said web member;

means aligning the abutting portions of said plate-like members with said other pair of said electrodes;

means supplying granular flux material at opposite sides of said abutting portions of said web and frame members to envelop said abutting portions thereof and the ends of said electrodes adjacent thereto;

means carried by said frame structure for continuously moving said rail and plate-like members past said electrodes; and means activating said electrodes to provide electric arcs submerged in said flux materials at opposite sides of said abutting portions of said rail and plate-like members to produce pools of molten weld material between the ends of said electrodes as said rail and plate-like members move thereby whereby said abutting portions of said rail and plate-like members are welded together.

8. An apparatus for forming an overhead monorail combination beam and rail including a T-shaped rail member having its stem welded to one edge of a plate-like web member and which web member has its opposite edge welded to a side of a plate-like flange member comprising:

a frame structure;

means for supporting a plate-like web member in a generally vertical position with its lower edge abutting a side of a plate-like flange member inwardly of its edges and a T-shaped rail member above said web member with the lower edge of its stem adjacent to the upper edge of said web member;

roller means carried by said frame supporting said plate-like flange member in a generally horizontal position;

two pairs of metallic arc welding electrodes;

a crosshead structure supported in said frame structure above said rail member for adjustment in a generally vertical direction;

means supporting said electrodes of one of said pairs of said electrodes in said crosshead structure adjacent to one another but at opposite sides of said web member;

said means supporting said rail member and said web member being adapted to align the abutting portions of said stem of said rail member and said upper edge of said web member with respect to one another and with one of said pairs of electrodes and including a pair of roller carrying members positioned at opposite sides of said rail and plate-like members and supported in said crosshead structure for movement towards and from the plane of said web member, a pair of vertically spaced rollers connected to each of said roller carrying members adapted to engage the stem of said rail member and said web member adjacent to but above and and below said abutting portions therof, and means for adjusting said rollers of each of said pairs relative to one another towards and from said stem of said rail member and said web member;

means carried by said crosshead structure supporting granular flux material at opposite side of said abutting portions of said rail and web members to envelop said abutting portions thereof and the ends of said electrodes of said one pair of said electrodes adjacent thereto;

means supporting the other of said pairs of said electrodes in said frame structure at opposite sides of said web member;

means aligning the abutting portions of said plate-like members with said other pair of said electrodes;

means supplying granular flux material at opposite sides of said abutting portions of said web and frame members to envelop said abutting portions thereof and the ends of said electrodes adjacent thereto;

means carried by said frame structure for continuously moving said rail and plate-like members past said electrodes; and means activating said electrodes to provide electric arcs submerged in said flux materials at opposite sides of said abutting portions of said rail and plate-like members to produce pools of molten weld material between the ends of said electrodes as said rail and plate-like members move thereby whereby said abutting portions of said rail and plate-like members are welded together.

9. An apparatus for forming an overhead monorail combination beam and rail including a T-shaped rail member having its stem welded to one edge of a plate-like web member and which web member has its opposite edge welded to a side of a plate-like flange member comprising:

a frame structure;

means for supporting a plate-like web member in a generally vertical position with its lower edge abutting a side of a plate-like flange member inwardly of its edges and a T-shaped rail member above said web member with the lower edge of its stem adjacent to the upper edge of said web member;

roller means carried by said frame supporting said plate-like flange member in a generally horizontal position;

two pairs of metallic arc welding electrodes;

a cross head structure above said rail member and supported by said frame structure for adjustment in a generally vertical direction;

means supporting said electrodes of one of said pairs of said electrodes in said crosshead structure adjacent to one another but at opposite sides of said web member;

said means supporting said rail member and said web member being adapted to align the abutting portions of said stem of said rail member and said upper edge of said web member with respect to one another and with one of said pairs of electrodes and including a pair of roller carrying members at opposite sides of said rail and plate-like members supported for pivotal movement about axes generally parallel to the plane of said web member, a pair of shafts supported in said roller carrying members with their longitudinal centers generally parallel to the plane of said web member and adjustable about their longitudinal centers and each having an eccentric portion, pairs of vertically spaced rollers connected to said shafts and adapted to engage the stem of said rail member and said web member adjacent to but above and below said abutting portions thereof, one of said pairs of rollers being supported on said eccentrics, and means for adjusting said shafts about their longitudinal centers;

means carried by said crosshead structure supporting granular flux material at opposite sides of said abutting portions of said rail and web members to envelop said abutting portions thereof and the ends of said electrodes of said one pair of said electrodes adjacent thereto;

means supporting the other of said pairs of said electrodes in said frame structure at opposite sides of said web member;

means aligning the abutting portions of said plate-like members with said other pair of said electrodes;

means supplying granular flux material at opposite sides of said abutting portions of said web and frame members to envelop said abutting portions thereof and the ends of said electrodes adjacent thereto;

means carried by said frame structure for continuously moving said rail and plate-like members past said electrodes; and means activating said electrodes to provide electric arcs submerged in said flux materials at opposite sides of said abutting portions of said rail and plate-like members to produce pools of molten weld material between the ends of said electrodes as said rail and plate-like members move thereby whereby said abutting portions of said rail and plate-like members are welded together.

References Cited in the file of this patent

UNITED STATES PATENTS

| | | |
|---|---|---|
| 1,831,343 | Caldwell | Nov. 10, 1931 |
| 2,179,802 | Sykes | Nov. 14, 1939 |
| 2,198,264 | Caputo | Apr. 23, 1940 |
| 2,269,538 | Lewbers | Jan. 13, 1942 |
| 2,529,812 | Peters | Nov. 14, 1950 |